UNITED STATES PATENT OFFICE 2,118,667

DIELECTRIC

Louis Domenach, Lyon, France, assignor to Compagnie Generale D'Electricite, Paris, France No Drawing. Application October 7, 1935, Serial No. 43,988. In Germany October 8, 1934

3 Claims. (Cl. 173—265)

In the manufacture of electric cables it is known to utilize gases acting wholly or partly as dielectrics either by reason of the construction of these cables themselves or by reason of transformations to which the original dielectrics are subjected during operation of the cables.

The gases hitherto used as dielectrics are for the cables of the first category, either simple gases such as nitrogen for example, or compound gases of relatively low molecular weight, such as carbonic acid gas for example, and for cables of the second category are either simple gases such as hydrogen for example, or are compound gases of relatively low molecular weight such as acetylene for example.

The present invention permits of considerably improving the manufacture and operation of these cables. It has for its object the use of gas of which the molecular weight is higher than 50, the said gases being either compound gases having the said molecular weight or a mixture of compound gases and of simple gases, the mean molecular weight of which is greater than 50.

The invention is based on the observation that the gradient of potential of ionization of the compound gases is the higher the greater the molecular weight of these gases.

Among the compound gases which satisfy the aforesaid condition are the hydrocarbons resulting from the distillation of coal or of petroleum and more particularly butane, the methylenic and ethylenic derivatives and the compounds of fluorine, bromine, chlorine and silicon.

Table I gives by way of example the gradient of ionization of several gases under the same conditions of temperature and pressure. It shows the superiority of compound gases of a molecular weight higher than 50.

The latter will be employed advantageously in cables the dielectric of which in principle is constituted in part by a gas under pressure.

The fact of using in these cables gases with a high molecular weight permits of obtaining, compared with the gas hitherto used, equivalent gradients of ionization using lower pressures lower than those ordinarily used in gas-filled cables, or, on the other hand, with equal pressure, of obtaining a higher gradient of ionization. In any case their employment provides an important economy by reducing the dimensions of the cables intended to operate under a given service tension.

The use of the compound gases of high molecular weight is also advantageous in cables with impregnated paper the dielectric of which is capable of being transformed during their operation in consequence of the spaces void of material which are produced in the insulation in the course of the operation of these cables. In this way these spaces void of material are filled with a gas which due to its high gradient of potential of ionization suppresses all ionization in these spaces.

It will be noted that among the compound gases of high molecular weight are to be found gases which liquefy at a relatively low pressure, lower sometimes than the conditions of pressure of operation of the cable in which it is desired to use them. In this case use may still be made of the advantages of the employment of a compound gas of high molecular weight by utilizing this compound gas which has a low pressure of liquefaction in the form of a mixture with simple gases or with compound gases of lower molecular weight, these gases having a pressure of liquefaction greater than the pressure of the compound gas or gases of high molecular weight.

The resulting gas presents the advantage of having a mean molecular weight greater than the molecular weight of that one of the constituents which has the lowest molecular weight.

Table II gives by way of example, to which the invention is not limited, the composition of different binary and ternary mixtures of high molecular weight and their pressure of liquefaction.

Table I

|  | Molecular weight or mean molecular weight | Gradient of ionization V/mm. |
|---|---|---|
| Hydrogen | 2 | 1,500 |
| Nitrogen | 28 | 2,000 |
| Acetylene | 26 | 2,300 |
| Carbonic acid gas | 44 | 2,500 |
| Methyl chloride | 50.5 | 2,750 |
| Butane | 58 | 2,900 |
| Ether | 74 | 3,500 |
| Chloroform | 119.5 | 4,500 |
| Chloroform 80%+carbon tetrachloride 20% | 126.4 | 4,650 |

In the above table, the expression V/mm. represents the voltage which causes ionization of the substances through a spark gap of one mm.

Table II

|  | Molecular weight or mean molecular weight | Pressure of liquefaction in kg./cm³ at 20° |
|---|---|---|
| Butane | 58 | 3 |
| Ethyl bromide | 109 | 0.28 |
| Ethyl bromide 30% +Butane 70% | 83.3 | 0.95 |
| Butane 50% +Carbonic acid gas 50% | 51 | 6 |
| Ethyl bromide 15% +Butane 35% +Carbonic acid gas 50% | 63.6 | 1.9 |

Having now particularly described and ascertained the nature of my said invention and in what manner the same is to be performed, I declare that what I claim is:

1. In a transmission cable having an outer casing and a conductor therein, insulation between said conductor and casing, said insulation constructed to provide cells or voids between the conductor and casing, and a gaseous dielectric composed principally of butane within said cells or voids, said gaseous dielectric having a mean molecular weight greater than 50, and a gradient of potential of ionization (V/mm.) greater than 2,500.

2. In a transmission cable having a casing and a conductor therein spaced from the inside wall thereof, a gaseous dielectric composed of butane confined within the casing.

3. A gaseous dielectric for a transmission cable having a closed casing about a conductor characterized in that said gas is composed of butane.

LOUIS DOMENACH.